United States Patent
Fradkin

(10) Patent No.: US 6,384,917 B1
(45) Date of Patent: May 7, 2002

(54) TOOTH COLOR MEASUREMENT SYSTEM

(76) Inventor: Boris Fradkin, P.O. Box 6225, Oranit (IL)

(*) Notice: Subject to any disclaimer, the term of this patent is extended or adjusted under 35 U.S.C. 154(b) by 0 days.

(21) Appl. No.: 09/041,125

(22) Filed: Mar. 12, 1998

(51) Int. Cl.[7] .................................................. G01J 3/51
(52) U.S. Cl. ........................ 356/402; 356/406; 356/407; 356/419; 433/29
(58) Field of Search ................................ 356/402, 405, 356/406, 407; 433/29

(56) References Cited

U.S. PATENT DOCUMENTS

| | | | | |
|---|---|---|---|---|
| 4,654,794 A | * | 3/1987 | O'Brien | 356/405 |
| 5,690,486 A | * | 11/1997 | Zigelbaum | 356/405 |
| 5,759,030 A | * | 6/1998 | Jung et al. | 356/405 |

* cited by examiner

Primary Examiner—F. L. Evans

(57) ABSTRACT

A method and apparatus for reliably and accurately matching tooth color, in which a light source is provided with an illumination lens and a relay lens to direct light to illuminate a measurement point in a chosen zone of a tooth selected in a patient's mouth. Light reflected from the tooth is passed through a third lens which focuses the reflected light simultaneously on three detectors. Each detector is provided with a color filter positioned in front of it to allow for only one of the basic red, green and blue (R,G,B) colors to reach the detector. The three detectors produce an output signal representing the R,G,B color coordinate related to the measurement point. These signals are converted to digital data suitable to be further processed by a data processing and control unit, which maps the R,G, B values into values of Hue, Saturation and Intensity (H, S, I) which are normalized to represent a tooth color vector. The process is repeated for a total of three zones on the tooth, developing a color vector set for comparison with a predetermined color vector set to match the closest color vector, allowing the tooth color to be classified as corresponding to one of the colors in the Master Teeth Set.

18 Claims, 6 Drawing Sheets

TOOTH COLOR MEASUREMENT SYSTEM

FIELD OF THE INVENTION

The present invention relates to the field of color measurement and in particular to equipment for measurement of tooth color.

BACKGROUND OF THE INVENTION

Recent advances in the practice of dentistry, especially in the field of implants, have given a more natural look to the use of artificial teeth. Advanced methods are used to temporarily or permanently implant artificial teeth in patients. One of the most crucial decisions a dentist must make in preparing the artificial tooth or teeth is to choose a color that will properly match the color of the natural teeth remaining in the mouth. Normally, a dentist uses a standard Master Teeth Set which consists of a set of artificial tooth models in varying shades of color. The dentist compares these sample artificial teeth visually with the teeth remaining in the patient's mouth and tries to establish which one of the teeth from the Master Teeth Set matches the patient's mouth environment optimally. This procedure is very subjective and can be influenced, for example, by the illumination conditions and the skill of the dentist.

There are known color measurement tools, referred to as calorimeters such as described by U.S. Pat. No. 4,449,821 to Fletcher, U.S. Pat. No. 4,767,703 to Ericsson et al., and U.S. Pat. No. 3,069,644 to Hartmann et al. None of these tools meet the requirements for measuring tooth color within a patient's mouth. Measurement must be made of a very small area with proper calibration.

Thus, it would be desirable to provide an exact and inexpensive device for tooth color measurement which would enable a dentist to properly match artificial teeth to the patient's mouth environment.

SUMMARY OF THE INVENTION

Accordingly, it is a principal object of the present invention to overcome the disadvantages associated with the method of manually matching prosthetic teeth and provide a method of reliably and accurately matching tooth color.

In accordance with a preferred embodiment of the present invention, there is provided a method for measurement of tooth color comprising the steps of:

illuminating a selected tooth zone in a patient's mouth with light;

filtering light reflected from said tooth zone into color components;

detecting each of said reflected light color components and producing a color component signal in accordance therewith;

converting said color component signals to digital data;

processing said digital data and mapping said color component signals into color values of hue, saturation and intensity (H,S,I) for said selected tooth zone;

normalizing said HSI values into a set of normalized color coordinates defining a color vector;

comparing said color vector with a predetermined set of color vectors;

determining a classification of said color vector closest to one of said predetermined set of color vectors; and providing said classification for matching an artificial tooth.

In a preferred embodiment of the invention, a light source is provided with an illumination lens and a relay lens. A light aperture at the end of a probe directs the light from the light source to illuminate a measurement point in a chosen zone of a tooth selected in the patient's mouth. Light reflected from the tooth is passed through a third lens which focuses the reflected light simultaneously on three detectors. Each detector is provided with a color filter positioned in front of it to allow for only one of the basic red, green and blue (R,G,B) colors to reach the detector.

A method of auto-calibration is provided by using a shutter which in its vertical position shunts a portion of the light produced by the light source to a reference white surface. The processing steps described below are performed, as for a tooth zone.

The three detectors produce an output signal representing the R,G, B color coordinate related to the measurement point. These signals are sent to the signal processing unit (SPU) where they are filtered to improve the signal-to-noise ratio. The SPU converts the analog signal values to digital data suitable to be further processed by a data processing and control unit (DPCU). In addition, the SPU performs a two step auto-calibration of the signal to provide precision and stable color measurement results.

The SPU interfaces with the DPCU to allow processing of the data. The R,G,B values are mapped into values of Hue, Saturation and Intensity (H, S, I) which are normalized using the NF. The three normalized values of (H, S, I) together represent a point and a radius vector. The distance from the point in (H, S, I) space to the closest point of reference value of the Master Teeth Set is determined to affiliate the point with a tooth color vector. The process is repeated for a total of three zones on the tooth. This allows the tooth color to be classified as corresponding to one of the colors in the Master Teeth Set.

Other features and advantages of the invention will become apparent from the following drawings and description.

BRIEF DESCRIPTION OF THE DRAWINGS

For a better understanding of the invention, with regard to the embodiments thereof, reference is made to the accompanying drawings, in which like numerals designate corresponding elements or sections throughout, and in which.

DETAILED DESCRIPTION OF A PREFERRED EMBODIMENT

Figure 1:
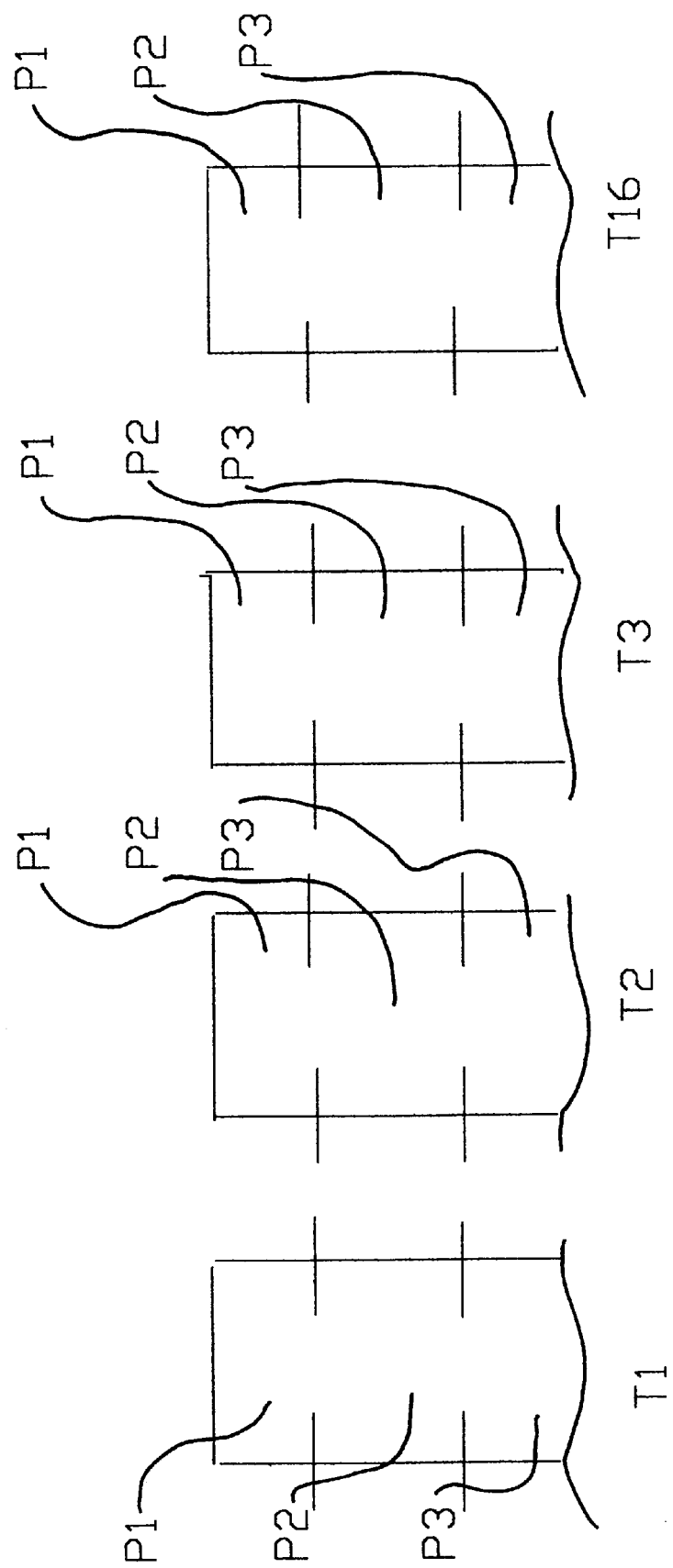
FIG. 1 is a representation of the Master Teeth Set.
Figure 2:
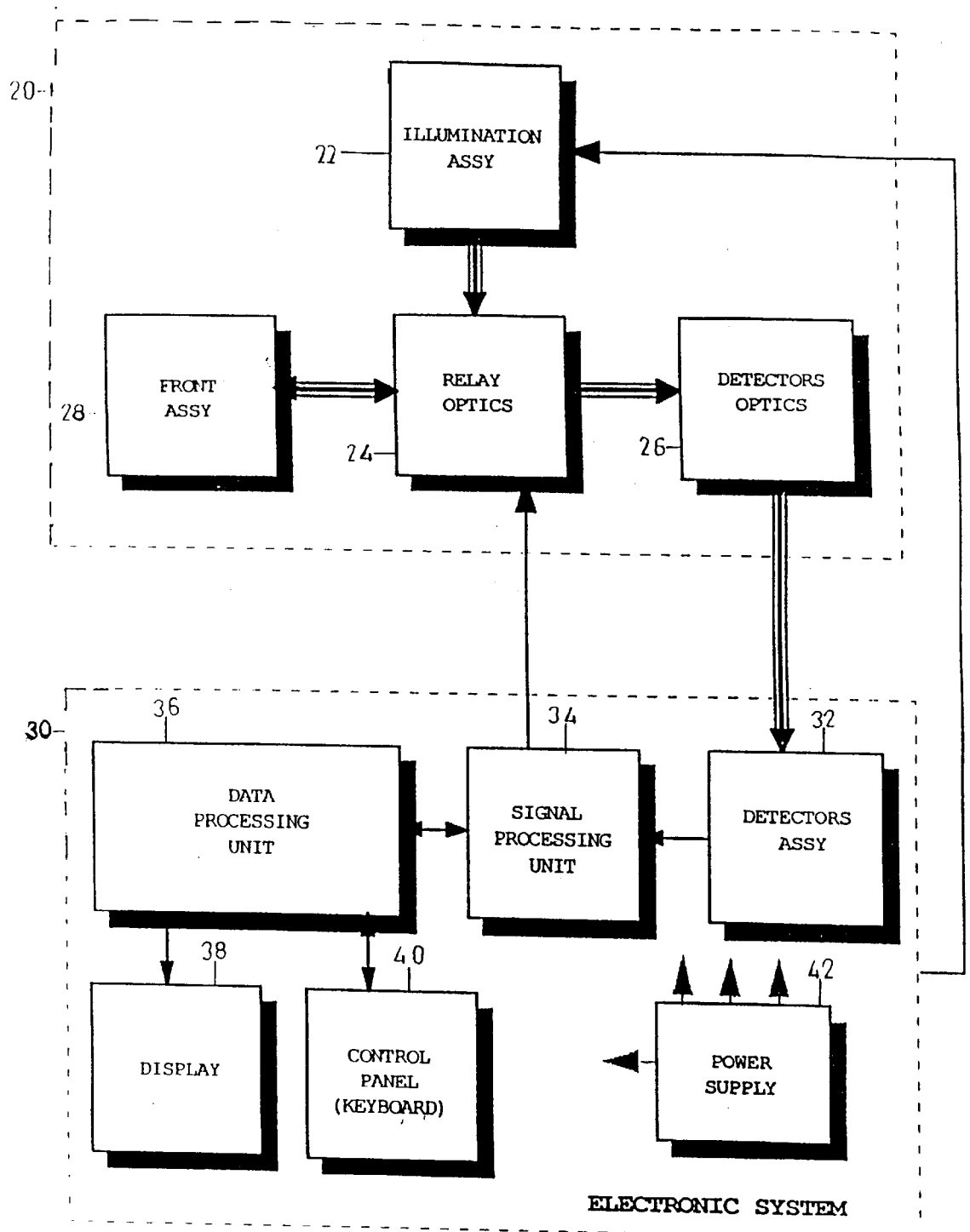
FIG. 2 is a block diagram of the general structure of the Tooth Color Measurement System.

Referring now to FIG. 1, there is shown a representation of the Master Teeth Set which contains, by way of example, 16 teeth ($T_1$–$T_{16}$) of varying colors which are all used for color comparison to the patient's mouth environment. Each tooth is divided into three zones, $P_1$–$P_3$, In FIG. 2 there is shown a block diagram of the general structure of the Tooth Color Measurement System. In upper box 20, the optical system comprises an illumination assembly 22, relay optics 24, and detector optics 26 all contained behind a front assembly 28.

Lower box 30 represents the electronic system in which the detector assembly 32 provides the signal processing unit 34 with readings of the color values which are converted to digital data for the data processing unit 36 and displayed on the display unit 38. Input can be provided via a control panel 40 in the form of a keyboard. A power source 42 is provided for the electronic system.

Figure 3:
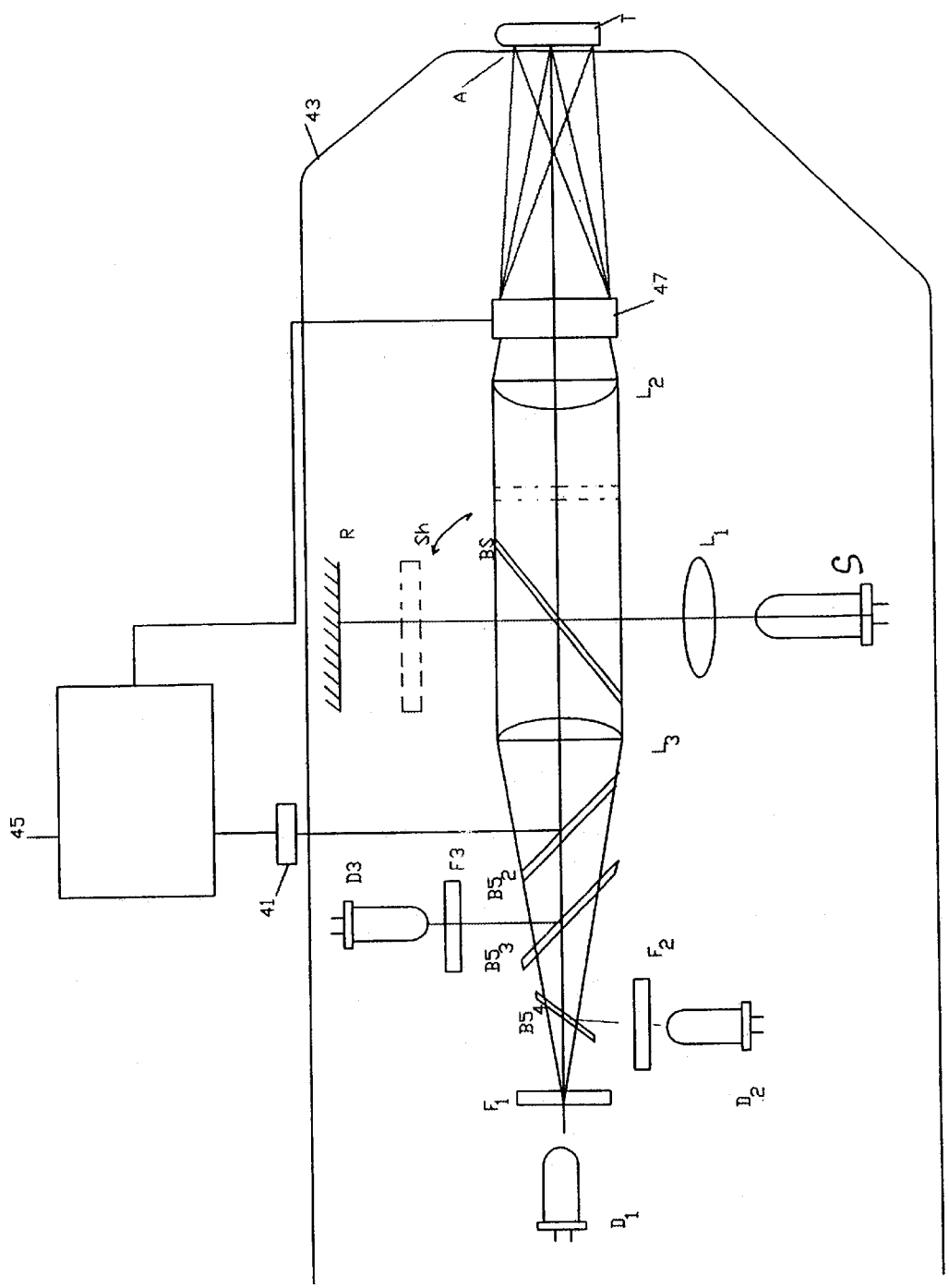
FIG. 3 is an optical layout of a Tooth Color Measurement System constructed and operated in accordance with the principles of the present invention.

FIG. 3 shows a schematic diagram of a system for tooth color measurement constructed and operated in accordance with the principles of the present invention. A light source (S) is provided with an illumination lens ($L_1$) and a relay lens ($L_2$) which is in the optical path created by reflection of light from a beam-splitter ($BS_1$). Light exits the end of probe 43 at light aperture (A) and directs the light from light source (S) to illuminate a chosen zone of a tooth (T) selected in the patient's mouth. Light reflected from the tooth is passed through $BS_1$ and a third lens ($L_3$) which focuses the reflected light simultaneously on three detectors ($D_1$, $D_2$, $D_3$) using three beam splitters ($BS_2$, $BS_3$, $BS_4$). Each detector is provided with a color filter ($F_1$, $F_2$, $F_3$) positioned in front of it to allow for only one of the basic red, green and blue (R,G,B) colors to reach the detector.

In an alternative embodiment, a CCD camera 41 is placed in the path of the reflected light from beam splitter $BS_2$ and the output signal is fed to a personal computer PC 45. This allows the operator to control an optical system 47 which focuses the light from the light source (S) on every point in the chosen tooth zone, enabling the system to record the tooth color information for every point selected by the operator.

A method of self-calibration is provided by using a shutter (Sh) which in its vertical position shunts a portion of the light produced by light source (S) to a reference white surface (R).

In an alternative embodiment, a fiber optics bundle can be used to transmit the light exiting at aperture (A) for illumination of the chosen tooth zone.

Figure 4:
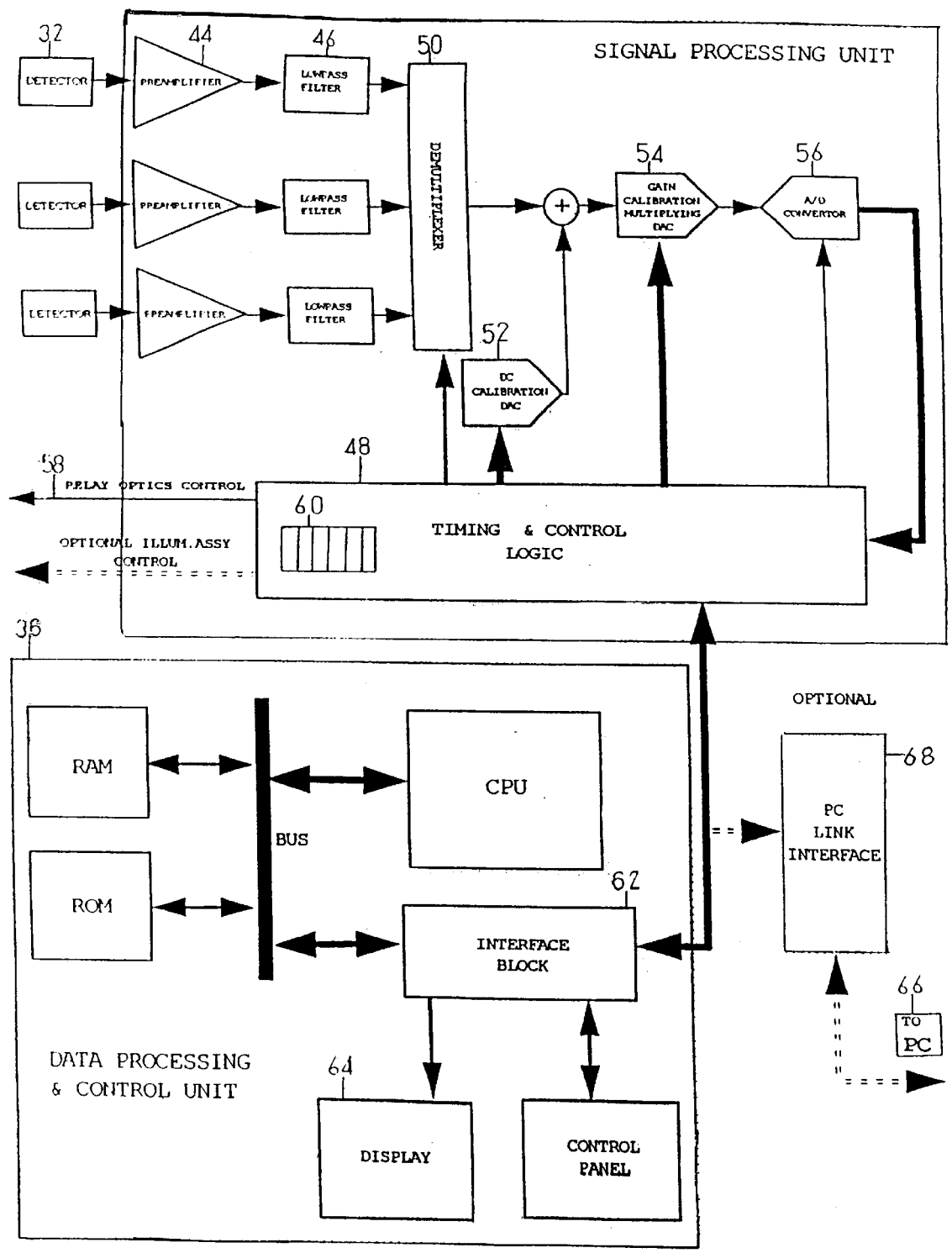
FIG. 4 is an electronic block diagram of the Tooth Color Measurement System.

In FIG. 4 an electronic block diagram of the Tooth Color Measurement System is shown. In the upper box, the Signal Processing Unit (SPU) 34, the detector assembly 32 produces signals which are amplified by low noise preamplifiers 44 and passed through low-pass filters 46 to suppress high frequency noise components of amplified signals and therefore improve the signal-to-noise ratio. SPU 34 activity is controlled by a Timing and Control Logic Unit (TCLU) 48. A demultiplexer 50 transforms the three parallel channels to one sequential channel by periodic input signal switching. A DC calibration D/A converter 52 adds to the output of demultiplexer 50 correcting DC voltages corresponding to the chosen demultiplexer channel. The signal then goes through a gain calibration multiplying D/A converter 54 to an A/D converter 56 that converts the analog signal values to digital data suitable to be further processed by a data processing and control unit (DPCU) 36 in the lower box.

To ensure precision and stable color measurement, a two step autocalibration method is provided in SPU 34. In the first step, TCLU 48 sends a command to relay optics 24, via relay optics control signal 58, to cut off the light detector illumination. TCLU 48 then sets gain calibration multiplying D/A converter 54 to a maximal gain. The output of every light detector in this step is its dark current. TCLU 48 checks if A/D converter 56 output data differs from preset reference values and sends DC calibration D/A converter 52 data to reset its output to reduce the difference. This process is repeated until the output of A/D converter 56 for all three light detector channels reaches the preset value. The correction data values for every channel are stored in three DC correction internal TCLU registers 60. After this procedure DC calibration D/A Converter 52 receives from TCLU 48 the stored data for every further measurement in accordance with the chosen demultiplexer channel.

In the second step, relay optics 24 are commanded to turn shutter (Sh) to reflect light onto the reference white surface (R). The gain calibration process is similar to the DC calibration procedure with the following difference: the calibration loop in this step is closed by the gain calibration multiplying D/A converter 54 and the calibration reference values corresponding to the full scale of A/D converter 56. The gain correction data for the light detector channels is stored in three gain calibration registers 60 in TCLU 48. TCLU 48 is connected by interface block 62 to DPCU 36 which provides data processing (see FIG. 5). A Liquid Crystal Display (LCD) 64 is provided to display the results. The output information may optionally be printed or written on magnetic media. The Tooth Color Measurement System may stand alone or be connected to a personal computer 66 through a PC link interface 68. In this embodiment the data processing is performed by and displayed on PC 66.

Figure 5:
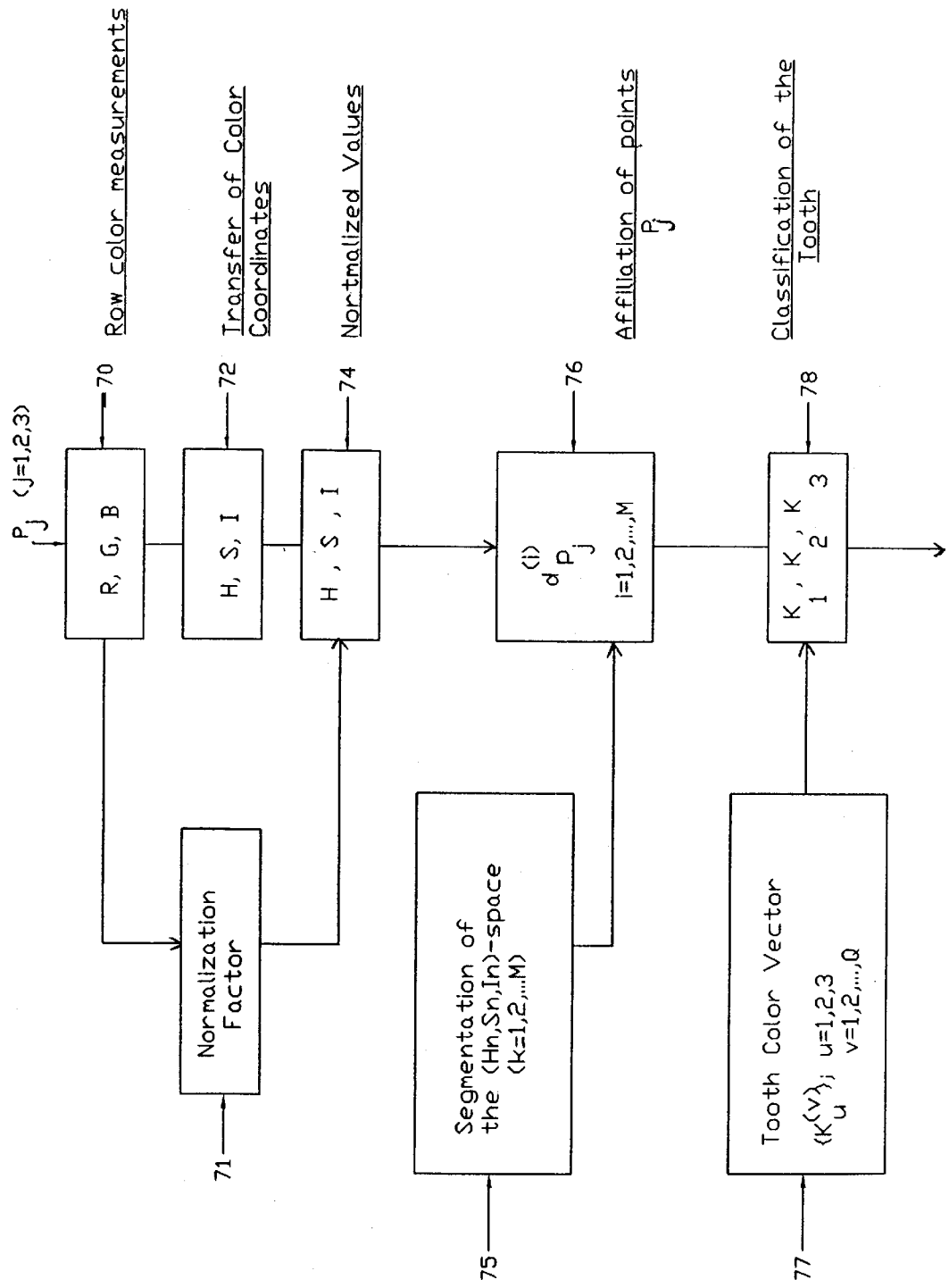
FIG. 5 shows a flowchart for tooth color measurement.

In FIG. 5 there is shown a flowchart representing the operation of the computer processor (DPCU). In block 70, the R, G, B values are obtained from SPU 34. In block 72, the R,G,B values are mapped into values of Hue, Saturation, and Intensity (H, S, I). To avoid the influence of illumination conditions, which can vary even during the course of measurements, in block 71 a Normalization Factor (NF) is computed at each single measurement and, in block 74, the H, S, I values are divided by the NF yielding normalized color coordinates ($H_n$, $S_n$, $I_n$). In the space of these normalized coordinates each zone of each Master Tooth is represented by a single point $(H_n^{(i)}, S_n^{(i)}, I_n^{(i)})^{(i)}$ and a radius vector $\rho_i$, as represented in block 76. All zones of all Master Teeth undergo a segmentation technique performed in block 75 in which the zones are represented by corresponding points $(H_n, S_n, I_n)^{(k)}$ and radius vectors $\rho_k$. The maximum number of points (M) is equivalent to forty-eight corresponding to three zones per tooth of the sixteen teeth in the Master Teeth Set.

Figure 6:
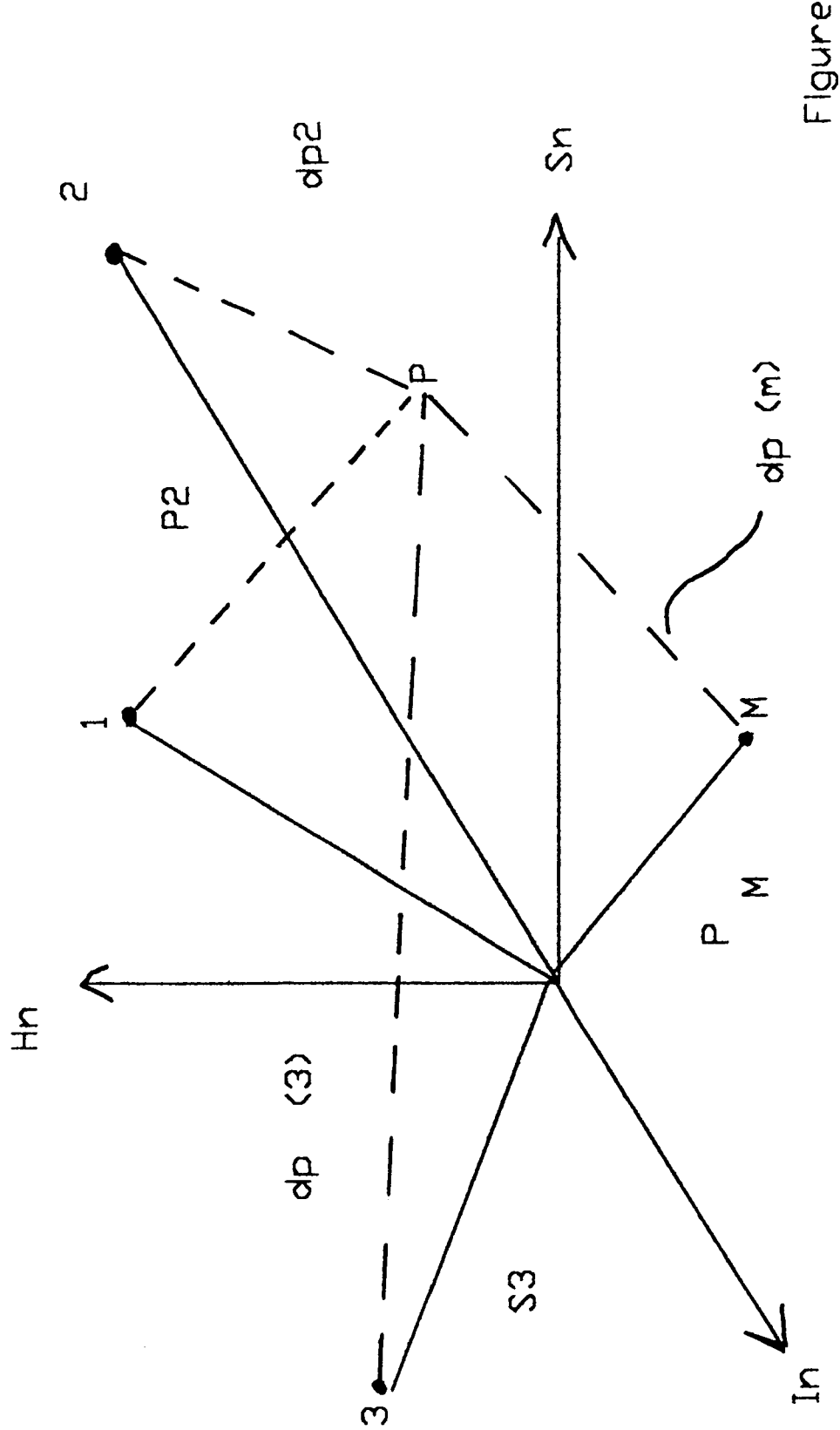
FIG. 6 is an illustration of the ($H_n$, $S_n$, $I_n$) space.

Once the chosen zone coordinates of a tested tooth ($H_n$, $S_n$, $I_n$) are measured, the corresponding point P in the ($H_n$, $S_n$, $I_n$) space is determined, as shown in FIG. 6. This allows the distances $d_p^{(k)}$ from P to each one of points 1,2,3 . . . M to be calculated and the affiliation of the measurement point P with regard to color is based on the minimal distance $d_p$.

This process is repeated for a second and third zone on the tooth, with each zone being represented respectively by $K_1$, $K_2$ and $K_3$. In block 78 these three are taken together for each tooth and represented by a vector ($K_1$, $K_2$, $K_3$). As shown in block 77, the 16 teeth of the Master Teeth Set create the Tooth Color Vector, $\overline{V}$ $$\overline{V} = \{K_1^{(1)}, K_2^{(1)}, K_3^{(1)}, K_1^{(2)} \ldots K_3^{(16)}\} \tag{1}$$

By comparing the vector ($K_1$, $K_2$, $K_3$) of a tested tooth with $\overline{V}$, a triad, N, is obtained, inside the V to which the vector ($K_1$, $K_2$, $K_3$) is closest. N is the result of the tooth classification.

In another preferred embodiment the light source is provided as a three color illumination source. In this embodiment, only one light detector channel is used and the demultiplexer function is realized by sequential light source switching.

In use, the Tooth Color Measurement System will determine the mouth environment of the patient while the dentist or dental technician touches surfaces of several teeth in the mouth with probe 43. The Tooth Color Measurement System immediately provides the relevant information about the recommended Master tooth and the number of the artificial tooth in the Master Teeth Set. This information is then provided to the technician producing the artificial tooth or teeth. Upon receipt of the artificial teeth the dentist can inspect the color quality by testing them with the Tooth Color Measurement System.

Having described the invention with regard to specific embodiments thereof, it is to be understood that the description is not meant as a limitation, since further modifications may now suggest themselves to those skilled in the art, and it is intended to cover such modifications as fall with in the scope of the appended claims.

I claim:

1. A method for measurement of tooth color comprising the steps of:

illuminating a selected tooth zone in a patient's mouth with light;

filtering light reflected from said tooth zone into color components;

detecting each of said reflected light color components and producing a color component signal in accordance therewith;

converting said color component signals to digital data;

processing said digital data and mapping said color component signals into color values of hue, saturation and intensity (H,S,I) for said selected tooth zone;

normalizing said HSI values into a set of normalized color coordinates defining a color vector;

comparing said color vector set with a predetermined set of color vectors;

determining a classification of said color vector closest to one of said predetermined set of color vectors; and providing said classification for matching an artificial tooth.

2. The method of claim 1 further comprising the step of repeating said illuminating, detecting, converting, processing and normalizing steps for a plurality of said tooth zones, to provide a set of color vectors each representing one of said tooth zones.

3. The method of claim 1 wherein said predetermined set of color vectors is associated with a Master Teeth Set of artificial teeth colors.

4. The method of claim 1 wherein said detecting step further comprises the step of amplifying an output signal associated with said reflected light color component which is used to produce said color component signal, wherein said amplifying step includes automatically calibrating the gain of said output signal.

5. The method of claim 4 wherein said automatic calibration further comprises the step of calibrating said gain in relation to a reference white surface.

6. The method of claim 1 wherein said method further comprises at least one of displaying and printing said classification as a number.

7. A system for measurement of tooth color comprising:

a light source for illuminating a selected tooth zone in a patient's mouth with light;

means for filtering light reflected from said tooth zone into color components;

means for detecting each of said reflected light color components and producing a color component signal in accordance therewith;

means for converting said color component signals to digital data;

means for processing said digital data and mapping said color component signals into color values of hue, saturation and intensity (H,S,I) for said selected tooth zone;

means for normalizing said HSI values into a set of normalized color coordinates defining a color vector;

means for comparing said color vector set with a predetermined set of color vectors;

means for determining a classification of said color vector closest to one of said predetermined set of color vectors; and means for providing said classification for matching an artificial tooth.

8. The system of claim 7 wherein said detecting means comprises a single detector and said light source comprises individual red, green and blue light sources.

9. The system of claim 7 wherein said detecting means comprises a single detector and said light source comprises a variable color light source.

10. The system of claim 7 wherein said detecting means comprises an array of line detectors, and said light source comprises comprises individual red, green and blue light sources.

11. The system of claim 7 wherein said detecting means comprises an array of line detectors, and said light source comprises comprises a variable color light source.

12. The system of claim 7 wherein said detecting means comprises an area detector, and said light source comprises individual red, green and blue light sources.

13. The system of claim 7 wherein said detecting means comprises an area detector, and said light source comprises a variable color light source.

14. The system of claim 7 further comprising a housing within which said light source is disposed, said housing having an aperture for exit of said illumination light.

15. The system of claim 7 further comprising a housing within which said light source is disposed, said housing having a fiber optic bundle extending therefrom for exit of said illumination light.

16. The system of claim 7 further comprising a controller controlling an optical system to focus said light on a chosen zone of said tooth, in response to a control signal, and a CCD camera for receiving said reflected light and recording said chosen zone reflection.

17. The system of claim 7 further comprising means for displaying said classification as a number.

18. The system of claim 7 further comprising means for printing said classification as a number.

* * * * *